United States Patent
Higo et al.

(10) Patent No.: US 8,722,769 B2
(45) Date of Patent: May 13, 2014

(54) LIGHT-CURING RESIN COMPOSITION AND OPTICAL MATERIAL

(75) Inventors: Yukiko Higo, Osaka (JP); Hiroshi Noro, Osaka (JP)

(73) Assignee: Nitto Denko Corporation, Osaka (JP)

( * ) Notice: Subject to any disclaimer, the term of this patent is extended or adjusted under 35 U.S.C. 154(b) by 212 days.

(21) Appl. No.: 13/329,459

(22) Filed: Dec. 19, 2011

(65) Prior Publication Data

US 2012/0165424 A1 Jun. 28, 2012

(30) Foreign Application Priority Data

Dec. 28, 2010 (JP) ................................. 2010-292561

(51) Int. Cl.
| | | |
|---|---|---|
| *B02B 1/04* | (2006.01) | |
| *B02B 3/00* | (2006.01) | |
| *C08G 59/04* | (2006.01) | |
| *C08G 59/06* | (2006.01) | |
| *C08K 5/05* | (2006.01) | |
| *C08K 5/053* | (2006.01) | |
| *C08L 63/00* | (2006.01) | |
| *C08L 63/02* | (2006.01) | |

(52) U.S. Cl.
USPC ............ 523/457; 359/642; 525/523; 528/110

(58) Field of Classification Search
None
See application file for complete search history.

(56) References Cited

U.S. PATENT DOCUMENTS

| | | |
|---|---|---|
| 5,059,512 A | 10/1991 | Babich et al. |
| 5,098,816 A | 3/1992 | Babich et al. |
| 5,110,711 A | 5/1992 | Babich et al. |
| 5,115,095 A | 5/1992 | Babich et al. |
| 5,693,688 A | 12/1997 | Priou |
| 2009/0279188 A1 | 11/2009 | Do |

FOREIGN PATENT DOCUMENTS

| | | | |
|---|---|---|---|
| JP | 61-021126 | | 1/1986 |
| JP | 61-21126 A | * | 1/1986 |
| JP | 3-237106 | | 10/1991 |
| JP | 8-104706 A | | 4/1996 |
| JP | 2005-520007 | | 7/2005 |
| JP | 3926380 B1 | | 6/2007 |
| JP | 2008-31438 A | | 2/2008 |
| JP | 2009-051980 | | 3/2009 |

OTHER PUBLICATIONS

Notification of Reasons for Refusal issued in corresponding JP Application No. 2010-292561, dispatched Jun. 4, 2013.
Notification of Reasons for Refusal issued in JP Application No. 2010-292561 dispatched Mar. 5, 2013.

* cited by examiner

*Primary Examiner* — Robert Sellers
(74) *Attorney, Agent, or Firm* — Sughrue Mion, PLLC

(57) ABSTRACT

A light-curing resin composition includes an epoxy resin having two or more epoxy groups in one molecule; a photopolymerization initiator including an anion component and a cation component; and an aralkyl compound having an alcoholic hydroxyl group.

4 Claims, No Drawings

LIGHT-CURING RESIN COMPOSITION AND OPTICAL MATERIAL

CROSS-REFERENCE TO RELATED APPLICATION

The present application claims priority from Japanese Patent Application No. 2010-292561 filed on Dec. 28, 2010, the contents of which are hereby incorporated by reference into this application.

BACKGROUND OF THE INVENTION

1. Field of the Invention

The present invention relates to a light-curing resin composition and an optical material, in particular, to a light-curing resin composition and an optical material that can be used widely in optical products.

2. Description of Related Art

Various materials have been examined as an adhesive and a sealing agent for optical components, and as a material for optical lens.

Of such various materials, in view of reducing the thickness of optical lens and increasing the image resolution, a focus is on a light-curing resin composition mainly composed of an epoxy resin having a high refraction and excellent heat resistance.

Examples of such a light-curing resin composition include a photosensitive composition proposed in Japanese Unexamined Patent Publication No. 2008-31438. The photosensitive composition is composed of an epoxy compound, a cationic photopolymerization initiator, and a hydroxyl group-containing compound (e.g., water) having a boiling point of 60 to 160° C.

SUMMARY OF THE INVENTION

However, in the case of the light-curing resin composition mainly composed of an epoxy compound such as the photosensitive composition described in Japanese Unexamined Patent Publication No. 2008-31438, when the light-curing resin composition is heated after being cured by light, it may turn yellow and its transparency may be decreased. In addition, such a light-curing resin has disadvantage: it generally has a high viscosity and poor handleability.

Thus, the present invention provides a light-curing resin composition and an optical material that can achieve improved refraction as well as improved transparency, heat resistance, and handleability.

A light-curing resin composition of the present invention includes an epoxy resin having two or more epoxy groups in one molecule; a photopolymerization initiator including an anion component and a cation component; and an aralkyl compound having an alcoholic hydroxyl group.

In the light-curing resin composition of the present invention, it is preferable that the mixing ratio of the aralkyl compound relative to 100 parts by mass of organic components excluding the aralkyl compound is 1 to 20 parts by mass.

It is preferable that the light-curing resin composition of the present invention further includes an alkoxysilane compound of at least one selected from the group consisting of methyltrimethoxysilane, 1,2-bis(trimethoxysilyl)ethane, and benzyltriethoxysilane.

An optical material of the present invention is obtained by curing the above-described light-curing resin composition.

A light-curing resin composition of the present invention contains an epoxy resin, and therefore a high refraction can be ensured. Moreover, the light-curing resin composition of the present invention contains an aralkyl compound having an alcoholic hydroxyl group. Therefore, even if the light-curing resin composition is heated after being cured by light, discoloration and loss of transparency can be reduced, and because the light-curing resin composition can be liquid at normal temperature, its handleability can be improved.

Therefore, with the light-curing resin composition and the optical material of the present invention, refraction can be improved, and at the same time, transparency, heat resistance, and handleability can be improved.

DETAILED DESCRIPTION OF THE INVENTION

A light-curing resin composition of the present invention contains an epoxy resin (A) having two or more epoxy groups in one molecule; a photopolymerization initiator (B) including an anion component and, a cation component; and an aralkyl compound (C) having an alcoholic hydroxyl group.

There is no particular limitation on the epoxy resin (A), but examples thereof include bisphenol epoxy resins such as bisphenol A epoxy resin, bisphenol F epoxy resin, bisphenol S epoxy resin, hydrogenated bisphenol A epoxy resin, and hydrogenated bisphenol F epoxy resin; a novolak epoxy resin such as phenol novolak epoxy resin; a straight chain aliphatic epoxy resin; an alicyclic epoxy resin such as dicyclo ring-type epoxy resin; and a fluorene epoxy resin.

Such examples of an epoxy resin (A) may be used alone or in combination.

Of these examples of the epoxy resin (A), in view of refraction, a preferable example is an epoxy resin having a post-cure refraction of 1.5 to 1.7 for light having a wavelength of 589 nm, and more preferable examples are a bisphenol epoxy resin such as bisphenol A epoxy resin, an alicyclic epoxy resin, and a fluorene epoxy resin.

The epoxy resin (A) has an epoxy equivalent of, for example, 50 to 500 g/eq, or preferably 100 to 300 g/eq.

The mixing ratio of the epoxy resin (A) relative to 100 parts by mass of organic components (described later) excluding the photopolymerization initiator (B) and the aralkyl compound (C) is, for example, 30 to 100 parts by mass, or preferably 35 to 100 parts by mass.

When the mixing ratio of the epoxy resin (A) is below 30 parts by mass, the optical material obtained by curing the light-curing resin composition may become brittle and its heat resistance may be reduced. On the other hand, when the mixing ratio of the epoxy resin (A) is within the above-described range, heat resistance of the optical material can be improved.

The mixing ratio of the epoxy resin (A) relative to 1 part by mass of the photopolymerization initiator (B) is, for example, 20 to 600 parts by mass, or preferably 30 to 500 parts by mass.

The mixing ratio of the epoxy resin (A) relative to 100 parts by mass of the aralkyl compound (C) is, for example, 400 to 5000 parts by mass, or preferably 500 to 4500 parts by mass.

The mixing ratio of the epoxy resin (A) relative to the total amount of light-curing resin composition is, for example, 30 to 98 mass %, or preferably 35 to 95 mass %.

The photopolymerization initiator (B) is a cation polymerization initiator that produces cationic species to cure the epoxy resin, and examples thereof include an onium salt including an anion component and a cation component.

Examples of anion components include phosphate ions such as $PF_6^-$ and $PF_4(CF_2CF_3)_2^-$; an antimonate ion such as $SbF_6^-$; and a sulfonate ion such as trifluoromethanesulfonate.

Examples of cation components include sulfonium such as aromatic sulfonium; iodonium such as aromatic iodonium;

phosphonium such as aromatic phosphonium; and sulfoxonium such as aromatic sulfoxonium.

Examples of such onium salts include those salts below having the above-described anion component as counteranions, including sulfonium salt such as aromatic sulfonium salt; iodonium salt such as aromatic iodonium salt; phosphonium salt such as aromatic phosphonium salt; and sulfoxonium salt such as aromatic sulfoxonium salt.

Such an example of the photopolymerization initiator (B) may be used alone or in combination.

Of these examples of the photopolymerization initiator (B), in view of curability by light, a preferable example is aromatic sulfonium salt.

Such a photopolymerization initiator (B) may also be prepared, for example, as a photopolymerization initiator solution, by dissolving the above-described onium salt in an organic solvent such as propylene carbonate.

Such a photopolymerization initiator solution has a concentration of, for example, 30 to 70 mass %, or preferably 40 to 60 mass %.

The mixing ratio of the photopolymerization initiator (B) relative to 100 parts by mass of organic components (described later) excluding the aralkyl compound (C) is, for example, 0.05 to 5 parts by mass, preferably 0.05 to 3 parts by mass, or more preferably 0.05 to 2.5 parts by mass.

When the mixing ratio of the photopolymerization initiator (B) is below 0.05 parts by mass, curability of the light-curing resin composition may be reduced, and when the mixing ratio of the photopolymerization initiator (B) exceeds 5 parts by mass, transparency of the optical material obtained by curing the light-curing resin composition may be reduced. On the other hand, when the mixing ratio of the photopolymerization initiator (B) is within the above-described range, curability of the light-curing resin composition, and transparency of the optical material can be improved.

The mixing ratio of the photopolymerization initiator (B) relative to 100 parts by mass of the aralkyl compound (C) is, for example, 1 to 140 parts by mass, or preferably 3 to 130 parts by mass.

The mixing ratio of the photopolymerization initiator (B) relative to the total amount of the light-curing resin composition is, for example, 0.05 to 2 mass %, or preferably 0.1 to 1.5 mass %.

Examples of the aralkyl compound (C) include an aralkyl compound in which an aliphatic group to which a hydroxyl group is bonded is bonded to an aromatic ring. Examples of the aliphatic group to which a hydroxyl group is bonded includes a straight chain or branched hydroxyalkyl group having 1 to 18 carbon atoms, and a hydroxy 5 to 6-membered ring formed from a hydroxyalkylene group having 1 to 5 carbon atoms and 1 to 4 carbon atoms of an aromatic ring. An example of aromatic ring includes an aromatic ring having 6 to 18 carbon atoms.

To be more specific, examples of such hydroxyalkyl groups include a straight chain or branched hydroxyalkyl group having 1 to 18 carbon atoms such as a hydroxymethyl group, a hydroxyethyl group, a hydroxy n-propyl group, a hydroxyisopropyl group, a hydroxy n-butyl group, a hydroxyisobutyl group, a hydroxy sec-butyl group, a hydroxy tert-butyl group, and a hydroxy n-hexyl group.

Examples of such hydroxy 5 to 6-membered rings include a 5 to 6-membered ring having 5 to 18 carbon atoms such as a hydroxycyclopentane ring, a hydroxycyclohexane ring, a (hydroxymethyl)-cyclopentane ring, a (hydroxymethyl)-cyclohexane ring, and a (hydroxyethyl)-cyclopentane ring.

Examples of such aromatic rings include an aromatic ring having 6 to 18 carbon atoms such as a benzene ring, a naphthalene ring, an anthracene ring, and a biphenyl ring.

For example, 1 to 4 aliphatic groups are replaced with an aromatic ring.

Examples of such aralkyl compounds (C) include benzenecycloalkylalcohol compounds such as 1-indanol (Chemical Formula (1) below), 2-indanol (Chemical Formula (2) below), and 9-fluorenylmethanol (Chemical Formula (3) below); naphthalenealkylalcohol compounds such as 2-(1-naphthyl)ethanol (Chemical Formula (4) below), 1-(1-naphthyl)ethanol (Chemical Formula (5) below), and 2-naphthylmethanol (Chemical Formula (6) below); benzenealkylalcohol compounds such as 2-phenylethylalcohol (Chemical Formula (7) below), 2-phenyl-2-propanol (Chemical Formula (8) below), 2-methyl-1-phenyl-2-propanol (Chemical Formula (9) below), 1,4-bis(2-hydroxyethyl)benzene (Chemical Formula (10) below), and 1-phenyl-2-propanol (Chemical Formula (11) below); and biphenylalkylalcohol compounds such as 4-hydroxymethylbiphenyl (Chemical Formula (12) below), 4-(1-hydroxyethyl) biphenyl (Chemical Formula (13) below), and 2-(4-biphenyl)-2-propanol (Chemical Formula (14) below).

Chemical Formula (1):
Chem. 1

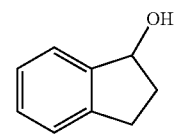

(1)

Chemical Formula (2):
Chem. 2

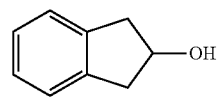

(2)

Chemical Formula (3):
Chem. 3

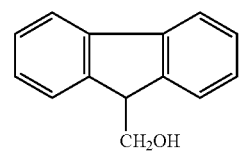

(3)

Chemical Formula (4):
Chem. 4

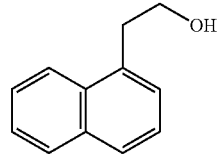

(4)

Chemical Formula (5):
Chem. 5

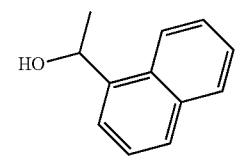

(5)

-continued

Chemical Formula (6):
Chem. 6

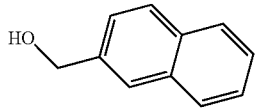
(6)

Chemical Formula (7):
Chem. 7

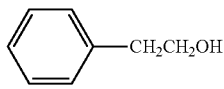
(7)

Chemical Formula (8):
Chem. 8

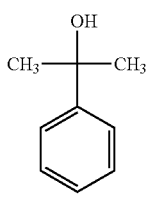
(8)

Chemical Formula (9):
Chem. 9

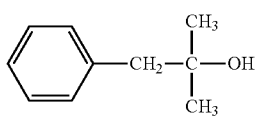
(9)

Chemical Formula (10):
Chem. 10

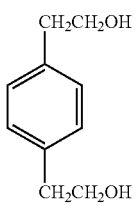
(10)

Chemical Formula (11):
Chem. 11

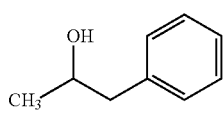
(11)

Chemical Formula (12):
Chem. 12

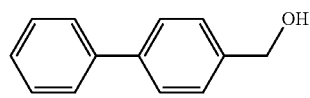
(12)

Chemical Formula (13):
Chem. 13

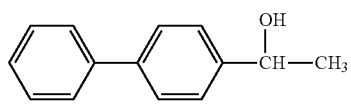
(13)

-continued

Chemical Formula (14):
Chem. 14

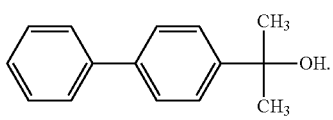
(14)

These aralkyl compounds (C) may be used alone or in combination.

Of these aralkyl compounds (C), preferable examples are 2-indanol (above-described Chemical Formula (2)), 2-naphthylmethanol (above-described Chemical Formula (6)), 2-phenylethylalcohol (above-described Chemical Formula (7)), 1-phenyl-2-propanol (above-described Chemical Formula (11)), and 4-hydroxymethylbiphenyl (above-described Chemical Formula (12)).

The mixing ratio of the aralkyl compound (C) relative to 100 parts by mass of organic components (described later) excluding the aralkyl compound (C) is, for example, 1 to 20 parts by mass, or preferably 3 to 15 parts by mass.

When the mixing ratio of the aralkyl compound (C) is below 1 part by mass, transparency of the optical material obtained by curing the light-curing resin composition cannot be improved, and when the mixing ratio of the aralkyl compound (C) exceeds 20 parts by mass, a disadvantage of brittle optical material may be caused. On the other hand, when the mixing ratio of the aralkyl compound (C) is within the above-described range, transparency and mechanical strength of the optical material can be improved.

That is, by blending in the aralkyl compound (C), transparency of the optical material can be improved. Furthermore, because the viscosity of the light-curing resin composition can be decreased, improvement in handleability can also be achieved. In particular, by blending the aralkyl compound (C) into a light-curing resin composition containing an epoxy resin with a high refraction, decrease in refraction after being cured by light can be suppressed, and improvement in transparency and handleability can be achieved.

The mixing ratio of the aralkyl compound (C) relative to the total amount of the light-curing resin composition is, for example, 0.5 to 20 mass %, or preferably 0.5 to 15 mass %.

Such a light-curing resin composition is prepared, for example, by heating, melting, and mixing the epoxy resin (A), the photopolymerization initiator (B), and the aralkyl compound (C).

The conditions of the heating, melting, and mixing are as follows: a heating temperature of, for example, 40 to 150° C., or preferably 40 to 130° C.

The light-curing resin composition of the present invention preferably also contains an alkoxysilane compound (D).

By including the alkoxysilane compound (D), transparency of the optical material obtained by curing the light-curing resin composition can be improved.

Examples of the alkoxysilane compound (D) include methyltrimethoxysiloxane, 1,2-bis(trimethoxysilyl)ethane, and benzyltriethoxysilane.

To include the alkoxysilane compound (D) in the light-curing resin composition, for example, the alkoxysilane compound (D) is added at the time of the above-described heating, melting, and mixing.

The mixing ratio of the alkoxysilane compound (D) relative to 100 parts by mass of organic components (described later) excluding the photopolymerization initiator (B) and the aralkyl compound (C) is, for example, 0.5 to 8 parts by mass, or preferably 0.5 to 5 parts by mass.

When the mixing ratio of the alkoxysilane compound (D) is below 0.5 parts by mass, transparency of the optical material cannot be improved, and when the mixing ratio of the alkoxysilane compound (D) exceeds 8 parts by mass, a disadvantage of a brittle optical material may be caused. On the other hand, when the mixing ratio of the alkoxysilane compound (D) is within the above-described range, transparency and mechanical strength of the optical material can be improved.

The mixing ratio of the alkoxysilane compound (D) relative to 100 parts by mass of the epoxy resin (A) is, for example, 0.5 to 15 parts by mass, or preferably 1 to 10 parts by mass.

The mixing ratio of the alkoxysilane compound (D) relative to 1 part by mass of the photopolymerization initiator (B) is, for example, 0.5 to 15 parts by mass, or preferably 1 to 10 parts by mass.

The mixing ratio of the alkoxysilane compound (D) relative to 100 parts by mass of the aralkyl compound (C) is, for example, 1 to 70 parts by mass, or preferably 5 to 60 parts by mass.

The mixing ratio of the alkoxysilane compound (D) relative to the total amount of the light-curing resin composition is, for example, 0.1 to 8 mass %, or preferably 0.5 to 6 mass %.

In the light-curing resin composition of the present invention, the following may be added as organic additives at an appropriate proportion in addition to the above-described components: for example, oxetane resin and a coupling agent; as necessary, for the purpose of improving curability, a photosensitizer such as anthracene, and an acid amplifier; and for the purpose of improving fluidity, a monofunctional epoxy resin. Other than the above, in accordance with purpose and use, a flexibilizer such as synthetic rubber and a silicone compound, an antioxidant, an antifoaming agent, and dye may be added at an appropriate proportion. Furthermore, as an inorganic additive, for example, pigments, and inorganic fillers may be added at an appropriate proportion.

Examples of oxetane resins include 4,4'-bis(3-methyloxetane-3-ylmethyloxymethyl) biphenyl, 4,4'-bis(3-ethyloxetane-3-ylmethyloxymethyl) biphenyl, 4-(3-ethyloxetane-3-ylmethyloxymethyl)-4'-(3-methyloxetane-3-ylmethyloxymethyl) biphenyl, and 4-(3-propyloxetane-3-ylmethyloxymethyl)-4'-(3-methyloxetane-3-ylmethyloxymethyl) biphenyl.

These oxctane resins may be used alone or in combination.

Of these oxetane resins, a preferable example is 4 4'-bis(3-ethyloxetane-3-ylmethyloxymethyl) biphenyl.

The mixing ratio of the oxetane resin relative to 100 parts by mass of the epoxy resin (A) is, for example, 5 to 180 parts by mass, or preferably 10 to 160 parts by mass.

The mixing ratio of the oxetane resin relative to the total amount of the light-curing resin composition is, for example, 3 to 65 mass %, or preferably 5 to 60 mass %.

By blending in such an oxetane resin, curability of the light-curing resin composition can be improved.

Examples of coupling agents include those already known coupling agents such as silane coupling agents and titanate coupling agents.

The mixing ratio of the coupling agent relative to the total amount of the light-curing resin composition is, for example, 0.1 to 5 mass %, or preferably 0.5 to 3 mass %.

By blending such a coupling agent, for example, when an optical material is produced by curing the light-curing resin composition on a transparent substrate such as glass, adhesion between the transparent substrate and the optical material can be improved.

That is, a light-curing resin composition of the present invention contains organic components composed of the epoxy resin (A), the photopolymerization initiator (B), the aralkyl compound (C), the alkoxysilane compound (D), and organic additives such as oxetane resin and a silane coupling agent; and inorganic components composed of inorganic additives.

Such a light-curing resin composition is, for example, dropped on a transparent substrate such as glass, and thereafter, a desired mold is pressed against the light-curing resin composition, thereby charging the inside of the mold. Then, the light-curing resin composition is irradiated with light and cured, and thereafter, the mold is removed, thereby producing an optical material integrated with the transparent substrate.

Examples of a device used for light irradiation include an ultraviolet (UV) lamp, and a single band lamp having a specific wavelength.

Although there is no particular limitation on the light irradiation conditions, an irradiation dose is, for example, 2000 to 20000 mJ/cm$^2$, or preferably 2000 to 15000 mJ/cm$^2$.

When the irradiation dose is below 2000 mJ/cm$^2$, the light-curing resin composition may not be cured sufficiently, and the obtained optical material may not be molded to a desired shape on the transparent substrate. When the irradiation does exceeds 20000 mJ/cm$^2$, there is a disadvantage, i.e., excessive irradiation causes light degradation.

On the other hand, when the irradiation dose is within the above-described range, the light-curing resin composition can be cured sufficiently, and therefore the optical material can be molded to a desired shape on the transparent substrate, and light degradation due to excessive irradiation can be prevented.

Furthermore, the optical material integrated with the transparent substrate is, as necessary, heat-treated at a predetermined temperature.

The conditions for the heat-treatment are as follows: a heat treatment temperature of, for example, 50 to 200° C., or preferably 80 to 170° C., and a heat treatment time of, for example, 0.5 to 3 hours, or preferably 0.5 to 2 hours.

By further conducting heat treatment, adhesiveness between the substrate and the cured resin can be improved.

Such a light-curing resin composition contains the aralkyl compound (C) having an alcoholic hydroxyl group. Therefore, the light-curing resin composition can be liquid at normal temperature, and handleability can be improved.

Furthermore, even if the optical material obtained by curing such a light-curing resin composition is heated, discoloration and loss of transparency can be reduced.

Therefore, a light-curing resin composition and an optical material of the present invention achieve improvement in refraction, while achieving improvement in transparency, heat resistance, and handleability.

The light-curing resin composition of the present invention is excellent in transparency and heat resistance, and therefore can be used, for example, for a material to be molded for optical components such as optical lenses, and a light-curing adhesive for fixing optical components.

To be more specific, the light-curing resin composition can be integrated with a transparent substrate by curing the light-curing resin composition on a transparent substrate such as glass, and can be produced as a high-quality hybrid lens.

Furthermore, the light-curing resin composition can be produced as a material to be molded for an optical component that can be mounted on a printed board by reflow soldering at high temperature.

EXAMPLES

While the present invention is described in further detail with reference to Examples and Comparative Examples in the following, the present invention is not limited to any of them by no means.

Examples 1 to 15 and Comparative Examples 1 to 3

Components were blended in accordance with the formulation shown in Table 1, and melt-mixed, thereby producing a light-curing resin composition.

Evaluation

The light-curing resin composition prepared in Examples and Comparative Examples was subjected to viscosity measurement, heat resistance and discoloration (transparency) test, and refraction measurement in the following manner. The results are shown in Table 1.

for 10 seconds, and thereafter the yellowness index value (Y.I. value) of the test piece was measured with a colour meter (SM-T, manufactured by Suga Test Instruments Co., Ltd.) in the transparent mode. A lower yellowness index value shows low discoloration and high transparency. The Y.I. value of 40 or less was evaluated as A, below 80 was B, and 80 or more was C.

(3) Refraction Measurement

The light-curing resin composition prepared in Examples and Comparative Examples was poured into a transparent mold having a size of 1×1.5×0.5 cm, and irradiated with ultraviolet ray (UV) of 16000 mJ. After being cured, the light-curing resin composition was removed from the mold, and heat-treated at 150° C. for 1 hour, thereby producing an optical material. The surface of the obtained optical material was ground with a grinder, and the refraction at 25° C. of the optical material was measured using a refractometer (manufactured by Atago Co., Ltd.).

TABLE 1

|  |  | Example |  |  |  |  |  |  |  |  |  |  |  |  |  |  | Comp. Ex. |  |  |
|---|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 | 1 | 2 | 3 |
| Epoxy Resin (A) | A-1 |  | 70 |  |  |  |  |  |  |  |  |  |  |  |  | 50 |  | 50 |  |
|  | A-2 | 70 |  | 70 | 70 | 70 | 70 | 70 | 70 | 70 | 70 | 70 | 70 | 70 | 20 |  | 70 |  | 15 |
|  | A-3 | 20 | 20 | 20 | 20 | 20 | 20 | 20 | 20 | 20 | 20 | 20 | 20 | 20 | 20 |  | 20 |  | 20 |
|  | A-4 |  |  |  |  |  |  |  |  |  |  |  |  |  |  | 50 |  | 50 |  |
|  | Total Epoxy | 90 | 90 | 90 | 90 | 90 | 90 | 90 | 90 | 90 | 90 | 90 | 90 | 90 | 40 | 100 | 90 | 100 | 35 |
| Photopolymerization Initiator (B) |  | 0.7 | 0.7 | 0.7 | 0.7 | 0.7 | 0.7 | 0.7 | 0.7 | 0.7 | 0.7 | 0.7 | 0.7 | 0.2 | 1.2 | 0.5 | 0.7 | 0.5 | 1.2 |
| Aralkyl Compound (C) | C-1 | 10 | 10 | 11 | 3 |  |  |  |  | 10 | 10 | 10 |  | 5 | 1 | 10 |  |  |  |
|  | C-2 |  |  |  |  | 9 |  |  |  |  |  |  |  |  |  |  |  |  |  |
|  | C-3 |  |  |  |  |  | 10 |  |  |  |  |  | 10 |  |  |  |  |  |  |
|  | C-4 |  |  |  |  |  |  | 15 | 6.5 |  |  |  |  |  |  |  |  |  |  |
| Alkoxysilane Compound (D) | D-1 |  |  |  |  |  |  |  |  | 1 |  |  |  |  |  |  |  |  |  |
|  | D-2 |  |  |  |  |  |  |  |  |  | 2 |  |  |  |  |  |  |  |  |
|  | D-3 |  |  |  |  |  |  |  |  |  |  | 3 | 5 |  |  |  |  |  |  |
| Oxetane Resin |  | 10 | 10 | 10 | 10 | 10 | 10 | 10 | 10 | 10 | 10 | 10 | 10 | 10 | 60 |  | 10 |  | 65 |
| Silane Coupling Agent |  |  |  |  |  |  |  |  |  |  |  |  |  | 1 | 1 |  |  |  | 1 |
| Evaluation | Viscosity | 2.7 | 2.7 | 2.5 | 7 | 2.8 | 6 | 5.9 | 6.1 | 2.5 | 2 | 2 | 2 | 8 | 12 | 0.6 | 9 | 1.3 | 13 |
|  | Y.I. value | 58 | 40 | 41 | 78 | 66 | 72 | 68 | 73 | 35 | 30 | 28 | 22 | 8 | 76 | 40 | 97 | 90 | 92 |
|  | Grade | B | A | B | B | B | B | B | B | A | A | A | A | A | B | A | C | C | C |
|  | Refraction | 1.6 | 1.6 | 1.5 | 1.6 | 1.6 | 1.6 | 1.6 | 1.6 | 1.6 | 1.6 | 1.5 | 1.5 | 1.5 | 1.6 | 1.5 | 1.6 | 1.5 | 1.6 |

(1) Viscosity Measurement

Using an E type viscometer (manufactured by TOKI Sangyo Co., Ltd.), the viscosity at 25° C. of the light-curing resin composition prepared in Examples and Comparative Examples was measured.

(2) Heat Resistance and Discoloration (Transparency) Test

The light-curing resin composition prepared in Examples and Comparative Examples was formed into a film having a thickness of 600 μm on a polyethylene terephthalate (PET) film (Diafoil® MRF-50, manufactured by Mitsubishi Polyester Film, Inc.) treated with silicone for releasing, and the film was irradiated with light (irradiation dose 8000 mJ/cm$^2$), thereby primarily curing the film. Thereafter, the film was heat-treated at 150° C. for 1 hour, thereby producing an optical material integrated with the PET film. The optical material was cut out to a test piece of a 3 cm square, and the test piece was allowed to go through a reflow oven of 260° C.

Abbreviations in Table 1 are indicated below.

Epoxy Resin (A)

A-1: bisphenol A epoxy resin (epoxy equivalent 185 g/eq., viscosity 1000 mPa·s)

A-2: bisphenol F epoxy resin (epoxy equivalent 160 g/eq., viscosity 1300 mPa·s)

A-3: fluorene epoxy resin (epoxy equivalent 243 g/eq., viscosity 0.6 Pa·s (150° C.))

A-4: alicyclic epoxy resin (CELLOXIDE 2021P, epoxy equivalent 138 g/eq., viscosity 150 to 400 mPa·s (25° C.), manufactured by Daicel Chemical Industries Ltd.)

Photopolymerization initiator (B): triarylsulfonium photopolymerization initiator (anion component: $PF_4(CF_2CF_3)_2^-$, cation component: Chemical Formula (15) below, concentration 50 mass % (solvent: propylene carbonate)

Chemical Formula (15):

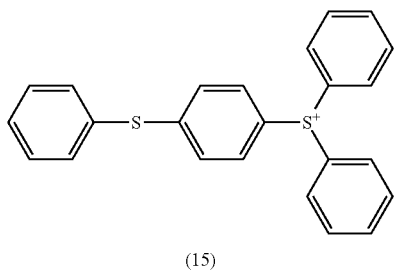

(15)

Aralkyl compound (C)
C-1: 1-phenyl-2-propanol (above-described Chemical Formula 11)
C-2: 2-phenyl-ethylalcohol (above-described Chemical Formula 7)
C-3: 2-indanol (above-described Chemical Formula 2)
C-4: 2-naphthylmethanol (above-described Chemical Formula 6)
Alkoxysilane compound (D)
D-1: methyltrimethoxysilane
D-2: 1,2-bis(trimethoxysilyl)ethane
D-3: benzyltriethoxysilane
Silane coupling agent: 3-glycidoxypropylmethyldiethoxysliane
Oxetane resin: 4,4'-bis(3-ethyloxetane-3-ylmethyloxymethyl) biphenyl While the illustrative embodiments of the present invention are provided in the above description, such is for illustrative purpose only and it is not to be construed as limiting the scope of the present invention. Modifications and variations of the present invention that will be obvious to those skilled in the art are to be covered by the following claims.

What is claimed is:

1. A light-curing resin composition comprising:
   an epoxy resin having two or more epoxy groups in one molecule,
   a photopolymerization initiator comprising an anion component and a cation component, the anion component of the photoinitiator being a phosphate ion, and
   an aralkyl compound having an alcoholic hydroxyl group.

2. The light-curing resin composition according to claim 1, wherein the mixing ratio of the aralkyl compound relative to 100 parts by mass of the epoxy resin is 1 to 20 parts by mass.

3. The light-curing resin composition according to claim 1, further comprising an alkoxysilane compound of at least one selected from the group consisting of methyltrimethoxysilane, 1,2-bis(trimethoxysilyl)ethane, and benzyltriethoxysilane.

4. An optical material obtained by curing a light-curing resin composition,
   wherein the light-curing resin composition comprises
   an epoxy resin having two or more epoxy groups in one molecule,
   a photopolymerization initiator comprising an anion component and a cation component, the anion component of the photoinitiator being a phosphate ion, and
   an aralkyl compound having an alcoholic hydroxyl group.

* * * * *